(No Model.)
A. RAY.
DUMPING CART.
No. 469,870. Patented Mar. 1, 1892.
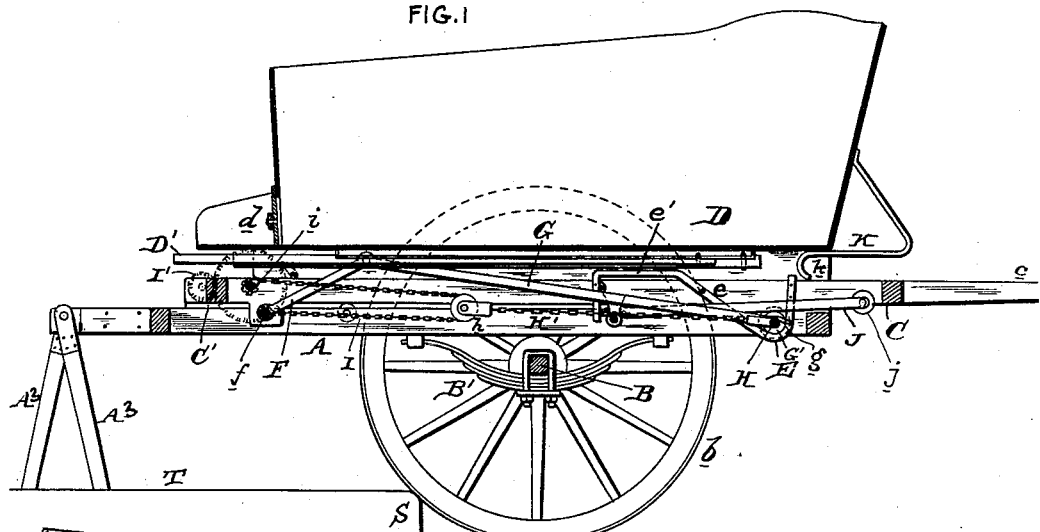
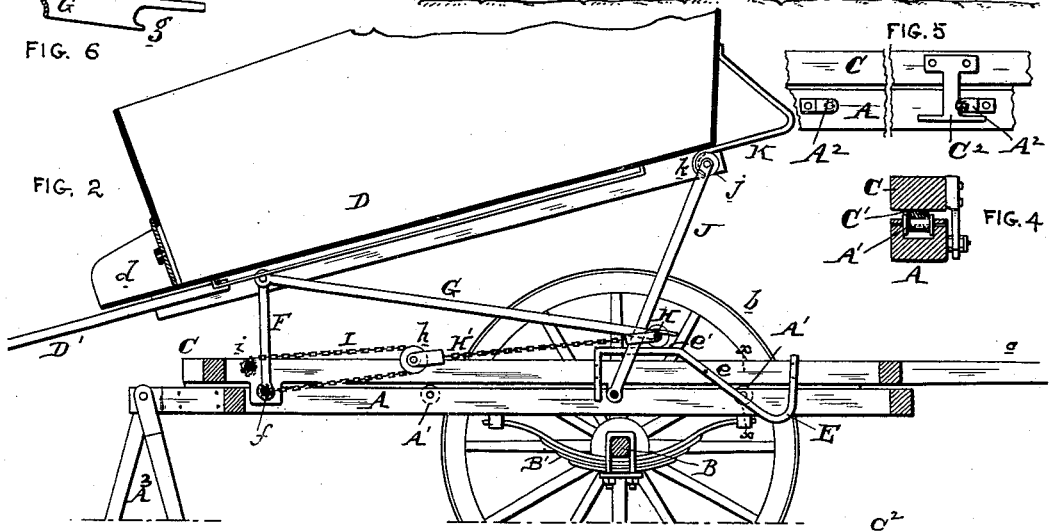
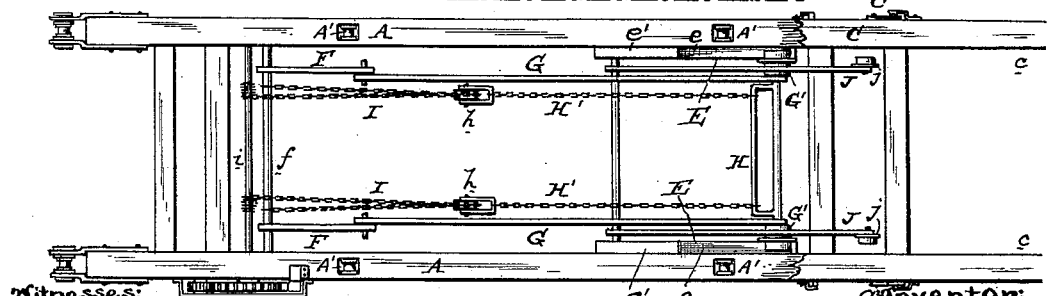
Witnesses: Inventor: Alex. Ray

UNITED STATES PATENT OFFICE.

ALEXANDER RAY, OF PHILADELPHIA, PENNSYLVANIA, ASSIGNOR OF ONE-HALF TO EDWARD S. LOWRY, OF SAME PLACE.

DUMPING-CART.

SPECIFICATION forming part of Letters Patent No. 469,870, dated March 1, 1892.

Application filed October 12, 1891. Serial No. 408,427. (No model.)

*To all whom it may concern:*

Be it known that I, ALEXANDER RAY, of the city and county of Philadelphia, and State of Pennsylvania, have invented an Improvement in Dumping Coal-Carts, of which the following is a specification.

My invention has reference to dumping coal-carts; and it consists of certain improvements which are fully set forth in the following specification and shown in the accompanying drawings, which form a part thereof.

The object of my invention is to so construct a two-wheeled vehicle or cart that it shall be adapted for discharging coal directly into houses through the mediation of chutes and at the same time to materially reduce the extent to which the wagon is required to project into the street when turned in position for discharging the coal.

Heretofore carts have been made with fixed shafts, so that the distance from the axle to the ends of the shafts was always the same, and consequently when the cart was run against the curbing the horse projected so far into the street as to be in the way of street-cars and passing vehicles. It is inconvenient in the ordinary construction of carts to make the distance between the axle and the shafts shorter than what has been customary, owing to the fact that too much weight would be thrown upon the rear of the axle and thereby make it difficult to obtain the proper traction effort of the horse.

The object of my invention is to overcome this defect by making the shafts adjustable, so that they can be run backward with the body of the cart prior to the dumping operation. In this manner the horse is moved back considerably, or to such an extent as to form no obstruction to the passing cars or other vehicles.

The object of my invention is, furthermore, to provide suitable devices for elevating one or both ends of the cart to give it the proper angle for causing the coal to be dumped.

Referring to the drawings, Figure 1 is a sectional side elevation through the center of my improved cart. Fig. 2 is a similar view to Fig. 1, but with the cart brought to the position for dumping. Fig. 3 is a plan view of the running-gear of the cart. Fig. 4 is a cross-section on line $x\ x$ of Fig. 2, showing the guides between the shaft-frame and sill of the wagon proper. Fig. 5 is a side elevation of parts shown in Fig. 4, designed to limit the movement of the shafts upon the main centers of the wagon; and Fig. 6 is a side elevation of the end of one of the elevating-bars.

A are the main sills of the wagon, and are secured to the axle B, having the wheels $b$, by means of springs B'. Loosely supported upon the upper part of these sills A, by means of grooved rollers A' and longitudinal guide-rails C', is the shaft-frame C, provided at the forward end with the shafts $c$. This shaft-frame is provided on each side with I-shaped irons $C^2$, which play between the stops $A^2$ upon the sills of the wagon, as best shown in Figs. 4 and 5. When the wagon is being pulled the iron $C^2$ presses against the projection $A^2$, arranged at the forward part of the sills A, and a small tongue at the lower end of the iron $C^2$ prevents any possibility of the frame C rising, so as to become displaced from the rollers A'. When the frame C is pushed back, the iron $C^2$ simply engages with a rear projection $A^2$ and limits the backward movement and at the same time prevents any rising of the frame C upon the sills A.

The rear ends of the sills A are provided with hinged legs $A^3$, which when turned down rest upon the sidewalk T to prevent the downward movement of the rear end of the sills A. When the cart-wheels $b$ are moved back against the curbing S, these leg portions $A^3$ when turned down, as indicated in Fig. 1, rest somewhere toward the middle of the sidewalk and prevent the downward movement of the rear ends of the sills A and frame C when the cart is elevated to the position shown in Fig. 2. This also takes the strain from the horses. When the cart has its parts in the position shown in Fig. 1 for travel, the leg portions $A^3$ are turned upward toward the cart-body, though in the drawings this position of these hinged parts is not shown.

The cart-body D is provided at the rear end with a gate $d$ and upon its under side with an extensible chute D', the construction of which is immaterial. The rear of the body D is connected with the frame C by means of two links F, hinged to a cross-rod $f$ upon the frame C. Hinged to the forward part of the frame C are two arms J, made considerably longer than the links F, and said arms are provided with rollers *j*, which work upon the under side of the guide-rails K, secured to the forward part of the body D. The rear end of the guide-rails K are curved, as at *k*, so as to receive the guide-wheels and lock them thereon when the body is fully raised to prevent abnormal upward rising of the forward end of the body.

Secured upon each side of the frame C are guide-rails E. These guide-rails have an upwardly and rearwardly inclined portion *e* and an elevated horizontal part *e'*. G' are rollers running upon the said guide-rails E, and the said rollers are journaled upon a transverse frame H. This frame H, with its rollers, may be pulled backward by means of chains H', having pulleys *h* at their free ends, and chains I, connected at one end with the transverse shaft *f* and passing about the pulleys *h* and connected at the other ends with the power-shaft *i*, which is operated by power-gearing I', secured upon the outside of the frame C. Upon rotating the shaft *i* the chains I are wound upon said shaft, and this action brings back the rollers G', causing them to mount the inclined guides *e* and then travel along the horizontal portion *e'* of the guides. The arms J rest upon the rollers G', so that as said rollers run upon the inclined guides and over the horizontal portion thereof the said arms J are caused to shift from the position shown in Fig. 1 to that shown in Fig. 2. This causes the front end of the body D to be elevated.

G are the bars, which are pivoted to the body part adjacent to the upper parts of the links F and formed with their ends, as indicated at *g* in Fig. 6, so as to be caught by the backwardly-moving frame H. If the arms G are disconnected from the frame H, then the backward movement of the arms J will cause the body D to be oscillated directly upon the rear end of the frame C, which is sufficient where the sidewalk is very narrow or where the coal is to be dumped into a coal-hole in the pavement. If, however, the arms J are locked in the frame H, then the backward movement of said frame in the act of elevating the arms J positively moves the links F backward and causes the rear end of the body D to rise as well as the forward end and simultaneously therewith, so that the entire body is elevated to a greater extent than in the former operation, said change being required when the sidewalk is very wide.

The cart shown in Fig. 1 has been moved to the curbing and the rear legs $A^3$ brought down into position to receive the downward thrust when the cart-body is moved to the rear. The horse is then backed, causing the frame C to slide backward upon the sills A into the position shown in Fig. 2. By operation of the power devices I' the body may be raised or elevated into the inclined position shown in Fig. 2, and from which it will be observed that the center of gravity of the body and its load is thrown greatly to the rear of the supporting-wheels and their axles to such a position that it would be impossible to employ any ordinary cart without the shafting-frame C. The extent to which the frame C shifts is immaterial to my invention, as it may be shifted one foot or three feet, more or less, as desired.

While I prefer the construction shown and find them most admirably adapted in practice to the purposes in the invention, I do not confine myself to the details thereof, as they may be modified in various ways without departing from the invention.

Having now described my invention, what I claim as new, and desire to secure by Letters Patent, is—

1. In a dumping-cart, the combination of running-gear, a movable frame provided with shafts movably supported upon the running-gear, so as to be shifted transversely to the axles, a body portion independent of but movably connected with the movable frame, and power devices for moving said body portion upon the movable frame.

2. In a dumping-cart, the combination of running-gear, a movable frame provided with shafts movably supported upon the running-gear, so as to be shifted transversely to the axles, a body portion movably connected with the movable frame, power devices for moving the said body portion upon the movable frame, and an adjustable support for the rear end of the running-gear to sustain it against depression when in the act of moving the body portion.

3. In a dumping-wagon running-gear, in combination with a movable frame provided with shafts and movable transversely to the axles, a movable body portion supported by the movable frame, arms pivoted to the movable frame at one end and mechanically connected at the other end with the body portion so as to elevate it, and power mechanism for operating the pivoted arms for the purpose of elevating the forward part of the body.

4. In a dumping-wagon running-gear, in combination with a movable frame provided with shafts and movable transversely to the axle, a movable portion supported by the movable frame, arms pivoted to the movable frame at one end and mechanically connected at the other end with the body portion so as to elevate it, power mechanism for operating the pivoted arms for the purpose of elevating the forward part of the body, link connections pivoted at one end to the movable frame and the other end near the rear of the movable body, and mechanical connection between the rear part of the body portion and the power mechanism, whereby the rear part of the body portion is simultaneously raised with the elevating of the forward part.

5. In a dumping-cart, the combination of running-gear, a movable frame provided with shafts movably supported upon the running-gear, so as to be shifted transversely to the axle, a body portion movably connected with the movable frame, power devices for moving the said body portion upon the movable frame, an adjustable support for the rear end of the running-gear to sustain it against depression when in the act of moving the body portion, and an adjustable chute supported upon the under side of the body portion and adapted to be extended therefrom when the body portion is elevated.

6. In a dumping-vehicle, the combination of the running-gear, a rearwardly-movable frame supported upon the running-gear and provided with shafts or means for connection with the horse or horses, and a movable body portion independent of but supported upon the movable frame and adapted to be operated thereon.

7. In a dumping-vehicle, the combination of the running-gear, a rearwardly-movable frame supported upon the running-gear and provided with shafts or means for connection with the horse or horses, a movable body portion supported upon the movable frame and adapted to be operated thereon, and adjustable supports for the rear end of the running-gear.

8. In a dumping-vehicle, the combination of the running-gear, a rearwardly-movable frame movably supported by said running-gear and provided with shafts or suitable means for connection with the horse or horses, a movable body portion connected to the movable frame by means of arms or links and adapted to be elevated or pulled thereby, and power devices for moving said arms or links.

9. In a dumping-cart, the combination of running-gear, a movable frame provided with shafts movably supported upon the running-gear so as to be shifted transversely to the axles, a body portion movably connected with the movable frame, power devices for moving said body portion upon the movable frame, an adjustable support for the rear end of the running-gear to sustain it against depression when in the act of moving the body portion, and stops for limiting the movement of the movable frame upon the running-gear.

10. In a dumping-wagon, the combination of a frame supported upon wheels, a body part connected with said frame by means of links at the rear end and pivoted arms at the forward end, the free ends of which arms work upon guides on the body portion in advance of the pivot-point of the links on the body and are hinged to the frame in advance of the pivot-points of the links on the said frame, and power mechanism for operating the pivoted arms for the purpose of elevating the forward part of the body.

11. In a dumping-wagon, the combination of a frame supported upon wheels, a body part connected with said frame by means of links at the rear end and pivoted arms at the forward end, the free ends of which arms work upon guides on the body portion, and power mechanism for operating the pivoted arms for the purpose of elevating the forward end of the body, consisting of the guides E, secured to the running-gear, rollers G', movable on the guides, frame H, carrying the said rollers, power-gearing I', shaft $i$, and connecting-chains between said frame H and power-shaft $i$.

12. In a dumping-wagon, the combination of a frame supported upon wheels, a body part connected with said frame by means of links at the rear end and pivoted arms at the forward end, the free ends of which arms work upon guides on the body portion, and power mechanism for operating the pivoted arms for the purpose of elevating the forward part of the body, consisting of the guides E, secured to the running-gear, rollers G', movable on said guides, frame H, carrying said rollers, power-gearing I', shaft $i$, and connecting-chains between said frame H and power-shaft $i$, and arms G, connected to the rear end of the body portion and to the frame H, whereby the arms J and links F are simultaneously moved by the same power devices.

13. In a dumping-wagon, the combination of a frame supported upon wheels, a body part connected with said frame by means of links at the rear end and pivoted arms at the forward end, the free ends of which arms work upon guides on the body portion, power mechanism for operating the pivoted arms for the purpose of elevating the forward part of the body, and a locking part on the body portion for locking it to the pivoted arms when fully raised to prevent abnormal rising of the front part of the body.

14. In a dumping-wagon, the combination of a frame supported upon wheels, a body portion connected with said frame by means of links at the rear end and pivoted arms at the forward end, the free ends of which arms work upon guides on the body portion, power mechanism for operating the pivoted arms for the purpose of elevating the forward part of the body, and arms G, connected to the rear end of the body portion and detachably connected to the frame H, whereby the arms J and links F are simultaneously moved by the same power devices or in which the arms G may de detached from the frame H, so as to allow the rear end of the body portion to permanently rest upon the frame-work which is supported upon the wheels.

15. In a dumping-vehicle, the combination of a running-gear having two parallel longitudinal sills, grooved rollers supported by said sills, a longitudinally-movable frame provided with shafts at the forward part, a rail upon the under side of said frame resting upon the rollers, and a movable body portion carried by said longitudinally-movable frame.

In testimony of which invention I have hereunto set my hand.

ALEXANDER RAY.

Witnesses:
ERNEST HOWARD HUNTER,
S. T. YERKES.